(12) United States Patent
Smith et al.

(10) Patent No.: US 7,568,840 B2
(45) Date of Patent: Aug. 4, 2009

(54) SEALED SPHERICAL BEARING

(75) Inventors: Paul R. Smith, Lincoln (GB); Jerome Gourdol, Lincoln (GB)

(73) Assignee: Mineba Co. Ltd., Nagano (JP)

( * ) Notice: Subject to any disclaimer, the term of this patent is extended or adjusted under 35 U.S.C. 154(b) by 255 days.

(21) Appl. No.: 10/551,354

(22) PCT Filed: Mar. 25, 2004

(86) PCT No.: PCT/GB2004/001300

§ 371 (c)(1),
(2), (4) Date: Jun. 21, 2006

(87) PCT Pub. No.: WO2004/088157

PCT Pub. Date: Oct. 14, 2004

(65) Prior Publication Data

US 2007/0065057 A1    Mar. 22, 2007

(30) Foreign Application Priority Data

Apr. 1, 2003    (GB) ................................. 0307549.6

(51) Int. Cl.
*F16C 23/04*      (2006.01)
*F16J 15/52*      (2006.01)
*F16C 11/06*      (2006.01)
(52) U.S. Cl. ...................... 384/192; 277/634; 277/635; 403/134
(58) Field of Classification Search ......... 384/140–141, 384/145–146, 202–206, 208, 211; 403/50–51, 403/122, 134, 140; 277/635–637; 29/898.046
See application file for complete search history.

(56) References Cited

U.S. PATENT DOCUMENTS

| 3,490,343 | A | * | 1/1970 | Afanador et al. ............... 92/168 |
| 4,003,666 | A | * | 1/1977 | Gaines et al. ................. 403/36 |
| 4,758,110 | A | * | 7/1988 | Ito ............................. 403/140 |
| 4,832,523 | A |   | 5/1989 | Glatzel et al. |
| 4,954,006 | A | * | 9/1990 | Suzuki et al. ................ 403/135 |
| 5,368,408 | A | * | 11/1994 | Shimizu et al. ............. 403/140 |
| 5,876,149 | A | * | 3/1999 | Dorr et al. .................. 403/134 |
| 6,652,179 | B2 | * | 11/2003 | De Freitas .................. 403/134 |
| 6,688,165 | B2 | * | 2/2004 | Heidemann ............... 73/117.02 |
| 6,739,789 | B2 | * | 5/2004 | Yagyu ........................ 403/134 |

(Continued)

FOREIGN PATENT DOCUMENTS

DE            3924003  A      11/1990

(Continued)

*Primary Examiner*—Marcus Charles
(74) *Attorney, Agent, or Firm*—Perkins Coie LLP

(57) ABSTRACT

A sealed spherical bearing having a bearing housing (1), a ball (2) located therein and a ring-like seal (4) having an inner edge (6) and an outer edge (5) located between the bearing housing (1) and the ball (2), one of the edges (5, 6) having a head (7) and a skirt (12) depending therefrom, the head (7) lying in an annular groove (8) formed in one of the ball (2) or the housing (1) and the skirt (12) lying on a lip (9) upstanding from the groove (8) to define at least two sealing lines between the seal (4) and the one of the ball (2) or the housing (1), the other edge of the seal being fixedly mounted to the other of the ball (2) or the housing (1).

12 Claims, 3 Drawing Sheets

U.S. PATENT DOCUMENTS

| | | | |
|---|---|---|---|
| 6,866,441 B2 * | 3/2005 | Yokoyama | 403/50 |
| 2003/0070476 A1 * | 4/2003 | Heidemann | 73/118.1 |

FOREIGN PATENT DOCUMENTS

| | | | |
|---|---|---|---|
| DE | 19812627 A1 | | 9/1999 |
| EP | 280018 A2 | * | 8/1988 |
| EP | 1031745 A2 | * | 8/2000 |
| EP | 1096161 A1 | * | 5/2001 |
| EP | 1114938 A | | 7/2001 |
| EP | 1865212 A1 | * | 12/2007 |
| GB | 1005682 A | | 9/1965 |
| JP | 09025927 A | * | 1/1997 |
| JP | 09166128 A | * | 6/1997 |
| JP | 2000046038 A | * | 2/2000 |
| JP | 2000230540 A | | 8/2000 |
| WO | WO 9623143 A1 | * | 8/1996 |

* cited by examiner

SEALED SPHERICAL BEARING

CROSS-REFERENCE TO RELATED APPLICATIONS

This application is a U.S. National Phase application of PCT/GB2004/001300, filed 25 Mar. 2004, the entirety of which is incorporated herein by reference. This application also claims the benefit of British Patent Application No. 0307549.6 filed 1 Apr. 2003.

TECHNICAL FIELD

This invention relates to a sealed bearing and more particularly to a sealed spherical bearing.

BACKGROUND

FIG. 1 of the accompanying drawings illustrates a sealed spherical bearing 100 having a bearing housing 101 and a ball 102. A rod 103 extends from the ball 102. The ball 102 is free to rotate with respect to the housing 101 in all directions, the only limitation being the stop provided by the rod 103 or a part of the ball knocking against the housing 101. A pair of ring-like rubber seals 104 are mounted on either side of the bearing housing between the bearing housing 101 and the ball 102 to protect the bearing surfaces between the ball 102 and the housing 101 from ingress of liquids such as water and contaminant particles. The seals 104 each have an outer edge 105 and an inner edge 106. The outer edge 105 is fixedly attached to the bearing housing 101 and the inner edge 106 terminates in a bulbous head 107 which rides in a groove 108 provided in the juncture between the ball 102 and the rod 103 (which are incidentally integrally formed with one another). The seals 104 are provided with a series of concertina-like concentric folds 109 which collapse and expand in response to movement of the grooves 108 towards and away from the bearing housing 101 so that the sealing engagement of the bulbous heads 107 within the grooves 108 is maintained.

This arrangement functions adequately but ingress of water and contaminant particles still occurs.

SUMMARY OF INVENTION

It is an object of the present invention to seek to provide an improved sealed bearing.

Accordingly, one aspect of the present invention provides a sealed spherical bearing having a bearing housing and a ball located therein, the bearing housing having an outer race, an inner race and an annular elastomeric portion sandwiched between the races.

In order that the present invention may be more readily understood, embodiments thereof will now be described, by way of example, with reference to the accompanying drawings, in which:

DETAILED DESCRIPTION

Figure 2:
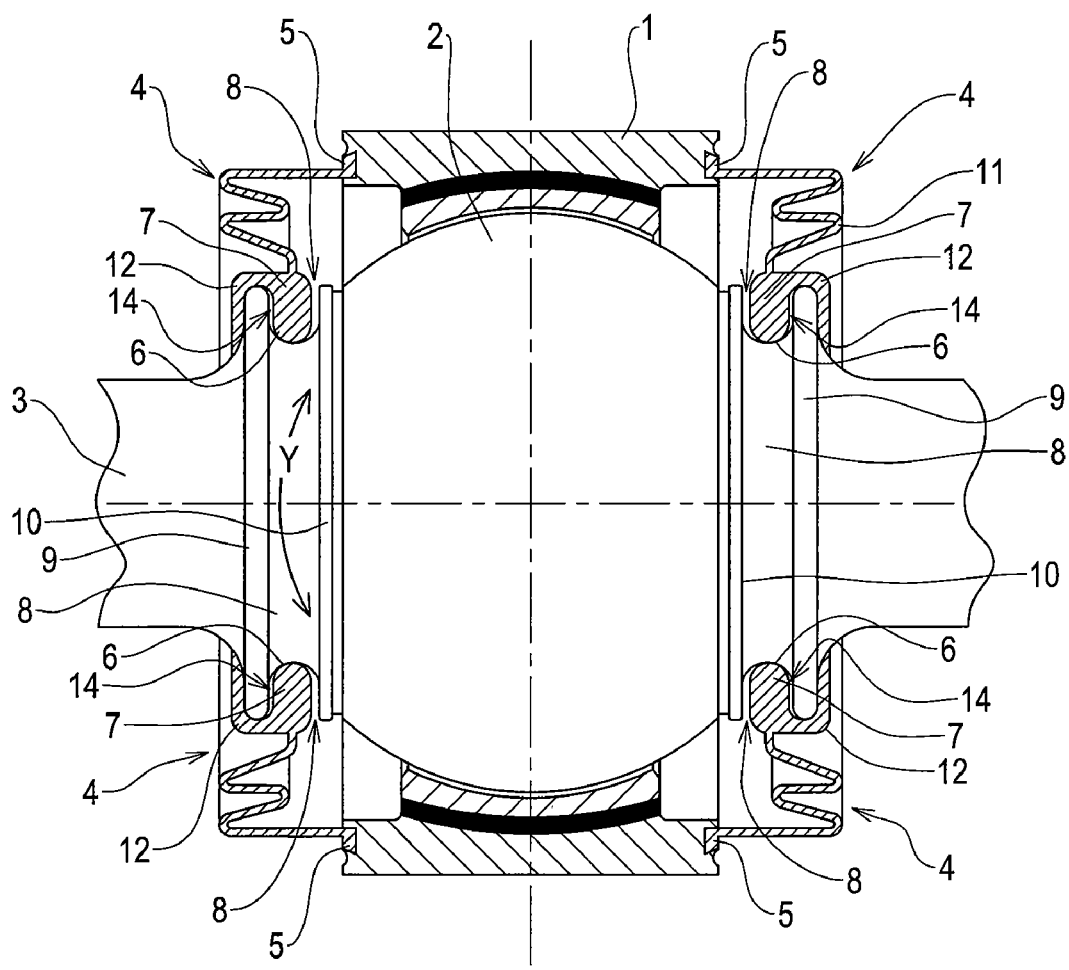
FIG. 2 is a partial cross-section of a sealed spherical bearing embodying the present invention.

Referring to FIG. 2 of the accompanying drawings, a sealed spherical bearing embodying the present invention has a bearing housing 1 and a ball 2. A rod 3 extends from the ball 2 and is preferably integrally formed with the ball 2. The ball 2 is free to rotate with respect to the housing 1 in all directions, the only limitation being the stop provided by the rod 3 or a part of the ball knocking against the housing 1.

A pair of ring-like rubber seals 4 are mounted on either side of the bearing housing between the bearing housing 1 and the ball 2 to protect the bearing surfaces between the ball 2 and the housing 1 from ingress of liquids such as water and contaminant particles. The seals 4 each have an outer edge 5 and an inner edge 6.

The outer edge 5 is fixedly attached to the bearing housing 1, preferably by being inserted into an annular groove formed around the bearing housing 1 and then staked or crimped in place. This provides a seal between the outer edge 5 and the bearing housing 1. The inner edge 6 terminates in a bulbous head 7 which rides in a groove 8 provided in the juncture between the ball 2 and the rod 3. The head 7 is free to ride in the groove by sliding in the groove and following any rotation of the head 7 with respect to the groove 8 as the ball 2 rotates with respect to the bearing housing 1. Thus, there is sliding contact between the head 7 and the groove 8 but the head 7 is maintained in sealing contact with the groove 8.

The grooves 8 are each in the form of a semi-circular trough terminating in an upstanding rounded lip 9 on one side, the inner side, and a straight sided annular wall 10 on the other side, the outer side.

The seals 4 are provided with a series of concertina-like concentric folds 11, which collapse and expand in response to movement of the grooves 8 towards and away from the bearing housing 1 so that the sealing engagement of the bulbous heads 7 within the grooves 8 is maintained.

Figure 1:
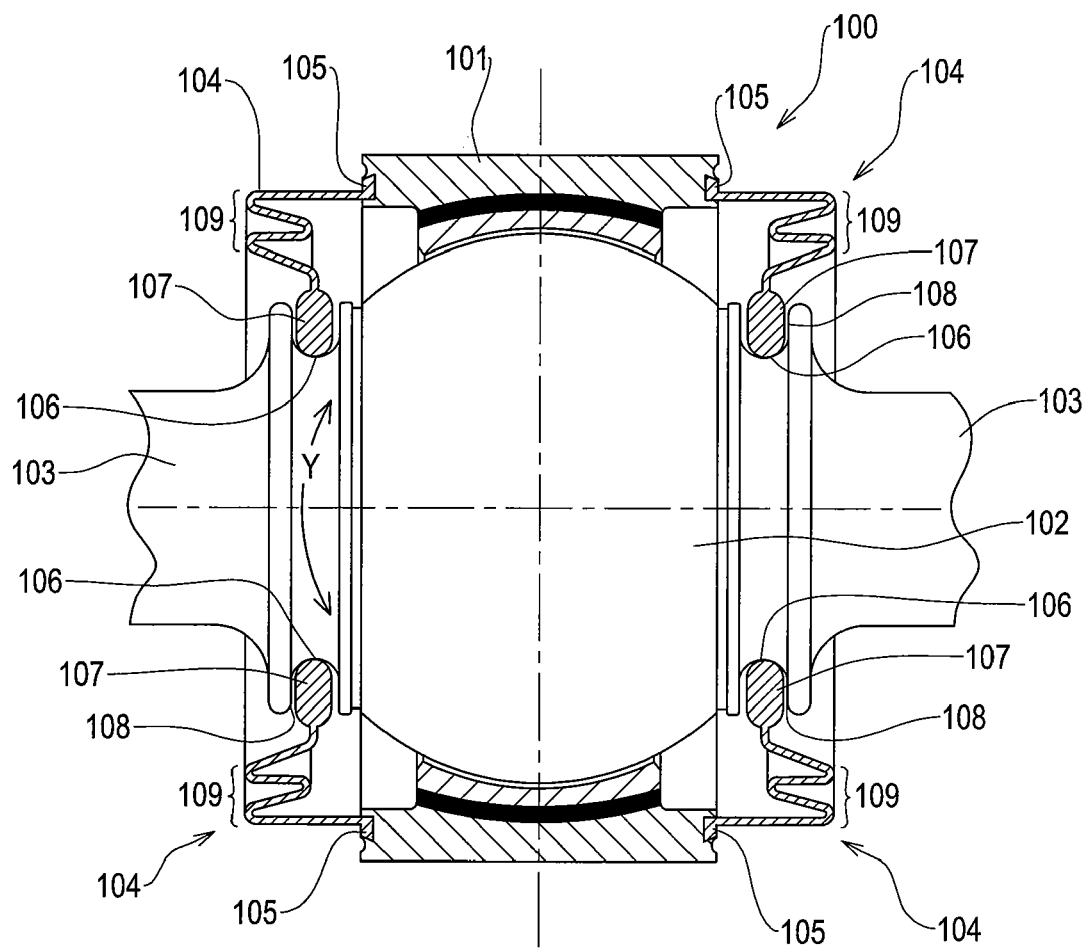
FIG. 1 is a partial cross-section of a sealed spherical bearing not in accordance with the present invention.

In addition to the seals 104 depicted in FIG. 1, the annular bulbous head 7 is formed with a skirt 12 which projects from the head 7 and cups over the lip 9 on the outer side of the groove 8. The skirt 12 is directed radially inwardly from the head 7 and tapers from a root end at the head to a tip end.

The skirt 12 contacts at least one point of the lip 9 and preferably is in contact with an area of the upper surface of the lip 9. The contact points or contact area create a sealing line or band between the skirt 12 and the ball 2 or rod 3. This sealing line or band is in addition to the sealing line or band between the head 7 and the trough 8. Thus, there are provided two seals separating the bearing surfaces from any liquid or contaminant particles. In addition, the skirt 12 provides a run-off for liquid away from the seal between the skirt 12 and lip 9, thereby further enhancing the sealing performance of the seal. Preferably, as shown in FIG. 2, a gap 14 is provided between the sealing line defined by the head 7 and the sealing line defined by the skirt 12.

The bearing depicted in FIG. 2 is a so-called hybrid bearing. It should be appreciated that the spherical bearing need not be a hybrid bearing with an elastomeric portion—non-hybrid bearings also benefit from the improvement in the seal.

Figure 3:
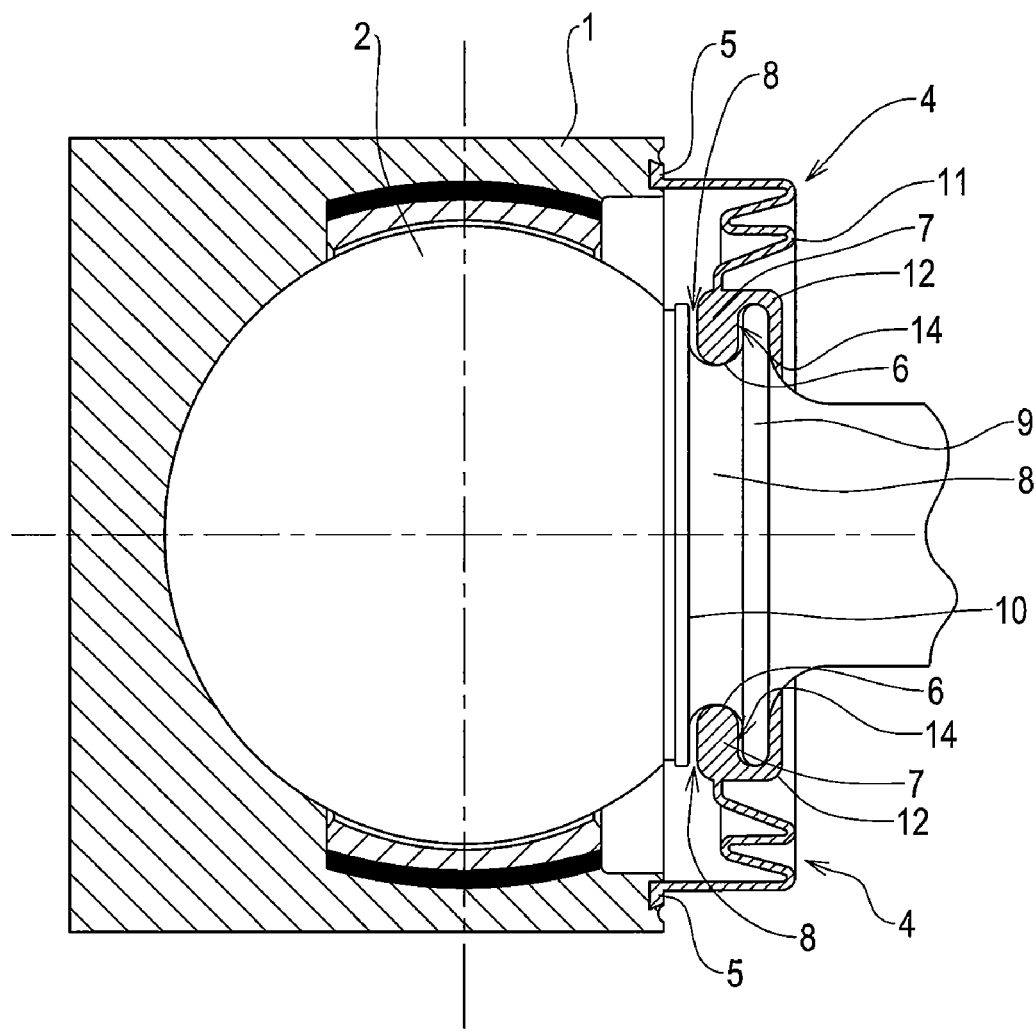
FIG. 3 is a partial cross-section of another sealed spherical bearing embodying the present invention.

The spherical bearing may have a bearing housing in the form of a half cup meaning that only one side of the spherical bearing needs sealing, in which case only a single seal 4 is provided, see FIG. 3. It is also possible for one side of the bearing housing to be capped so that only one seal is needed.

The mechanical arrangement in which the outer edge of the seal is fixedly mounted to the housing and the inner edge rides in a groove in the ball could be reversed such that the inner edge of the seal is fixedly mounted to the ball and the outer edge rides in a groove in the bearing housing.

The groove 8 is shown in FIG. 2 as being at the juncture between the integrally formed ball 2 and rod 3. It is to be appreciated that the invention is not limited to the groove 8 being located at this position. The groove could be located more towards the centre of the ball 2 or further towards the rod 3, away from the ball centre.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. A sealed spherical bearing having a bearing housing, a ball located therein and a ring-like seal having an inner edge and an outer edge located between the bearing housing and the ball, one of the edges having a head and a skirt depending therefrom, the head lying in an annular groove formed in one of the ball or the bearing housing, wherein the head is free to ride in the groove, and the skirt lying on a lip upstanding from the groove to define at least two sealing lines between the seal and the one of the ball or the bearing housing, the other edge of the seal being fixedly mounted to the other of the ball or the bearing housing.

2. A sealed bearing according to claim 1, wherein the groove is formed in the ball, the inner edge has the head and the skirt depending therefrom and the outer edge is fixedly mounted to the bearing housing.

3. A sealed bearing according to claim 1, wherein the skirt is directed radially inwardly from the head.

4. A sealed bearing according to claim 1, wherein the skirt tapers from a root end at the head to a tip end.

5. A sealed bearing according to claim 1, wherein the upstanding lip is a side-wall of the groove.

6. A sealed bearing according to claim 1, wherein a gap is provided between the sealing line defined by the head and the sealing line defined by the skirt.

7. A sealed bearing according to claim 1, wherein the skirt makes a sealing contact over a circumferential area of the upstanding lip.

8. A sealed bearing according to claim 1, wherein the groove is formed in the ball, and wherein the inner edge has the head and the skirt depending therefrom and the outer edge is fixedly mounted to the bearing housing, and further wherein both the head and the skirt are rotatable relative to the ball.

9. A sealed spherical bearing, comprising:
a bearing housing;
a ball located in the bearing housing; and
a ring-like seal between the bearing housing and the ball, the seal having a first edge and a second edge spaced apart from the first edge, the first edge having a head and a skirt depending therefrom, the head lying in an annular groove formed in one of the ball or the bearing housing and the skirt lying on a lip upstanding from the groove, the second edge of the seal being fixedly mounted to the other of the ball or the bearing housing,
wherein both the head and the skirt are rotatable relative to the ball or the bearing housing.

10. A sealed bearing according to claim 9, wherein the groove is formed in the ball, and wherein the first edge has the head and the skirt depending therefrom, and wherein the second edge is fixedly mounted to the bearing housing.

11. A sealed bearing according to claim 9, wherein the skirt tapers from a root at the head to a tip.

12. A sealed bearing according to claim 9, wherein the upstanding lip is a side-wall of the groove.

* * * * *